US010597852B2

(12) United States Patent
Hori et al.

(10) Patent No.: US 10,597,852 B2
(45) Date of Patent: Mar. 24, 2020

(54) WHEEL LOADER AND METHOD FOR AUTOMICALLY ACCUMULATING TRANSPORT OPERATION INFORMATION OF WHEEL LOADER

(71) Applicant: KOMATSU LTD., Tokyo (JP)

(72) Inventors: Takashi Hori, Kanazawa (JP); Satoru Utsumi, Komatsu (JP); Hideki Tsuji, Komatsu (JP)

(73) Assignee: KOMATSU LTD., Tokyo (JP)

( * ) Notice: Subject to any disclaimer, the term of this patent is extended or adjusted under 35 U.S.C. 154(b) by 259 days.

(21) Appl. No.: 15/554,250

(22) PCT Filed: Apr. 28, 2016

(86) PCT No.: PCT/JP2016/063439
§ 371 (c)(1),
(2) Date: Aug. 29, 2017

(87) PCT Pub. No.: WO2016/208275
PCT Pub. Date: Dec. 29, 2016

(65) Prior Publication Data
US 2018/0051445 A1 Feb. 22, 2018

(30) Foreign Application Priority Data
Jun. 24, 2015 (JP) .................................. 2015-126610

(51) Int. Cl.
*E02F 9/26* (2006.01)
*G01G 19/08* (2006.01)
(Continued)

(52) U.S. Cl.
CPC ............... *E02F 9/26* (2013.01); *E02F 3/283* (2013.01); *E02F 3/422* (2013.01); *E02F 9/264* (2013.01);
(Continued)

(58) Field of Classification Search
None
See application file for complete search history.

(56) References Cited

U.S. PATENT DOCUMENTS 6,167,337 A * 12/2000 Haack .................. E02F 9/26
222/63
6,518,519 B1 * 2/2003 Crane, III .............. E02F 9/264
177/136
(Continued)

FOREIGN PATENT DOCUMENTS

CN 2775146 Y 4/2006
CN 201615783 U 10/2010
(Continued)

OTHER PUBLICATIONS

The International Search Report for the corresponding international application No. PCT/JP2016/063439, dated Jul. 26, 2016.
(Continued)

*Primary Examiner* — Dale W Hilgendorf
*Assistant Examiner* — Alexander Connor Larkin Bost
(74) *Attorney, Agent, or Firm* — Global IP Counselors, LLP

(57) ABSTRACT

The wheel loader includes a boom, a bucket, a travel device, a travel distance measuring unit, a state determining unit, and an accumulating unit. The bucket is attached to the tip end of the boom. The travel distance measuring unit measures a travel distance. The state determining unit determines the loaded state of the bucket. The accumulating unit automatically accumulates transport operation information about the load of the bucket when a predetermined distance or more is traveled under the loaded state.

20 Claims, 8 Drawing Sheets

(51) Int. Cl.
  *E02F 3/28* (2006.01)
  *E02F 3/42* (2006.01)
  *G07C 5/08* (2006.01)

(52) U.S. Cl.
  CPC ............. *G01G 19/08* (2013.01); *G07C 5/085* (2013.01); *G07C 5/0825* (2013.01)

(56) References Cited

U.S. PATENT DOCUMENTS

| | | | |
|---|---|---|---|
| 7,633,021 B2 | 12/2009 | Pfohl et al. | |
| 8,428,832 B2* | 4/2013 | Marathe | E02F 9/2217 701/50 |
| 8,515,627 B2* | 8/2013 | Marathe | E02F 9/264 701/124 |
| 8,838,331 B2* | 9/2014 | Jensen | G01N 9/36 701/34.4 |
| 9,091,586 B2* | 7/2015 | Hague | G01G 19/10 |
| 9,157,215 B2* | 10/2015 | Stanley | E02F 9/264 |
| 9,200,432 B1* | 12/2015 | Shatters | G01G 19/083 |
| 2006/0100808 A1* | 5/2006 | Lueschow | G01G 19/10 702/101 |
| 2008/0169131 A1* | 7/2008 | Takeda | E02F 9/26 177/136 |
| 2008/0263911 A1* | 10/2008 | Shoenmaker | E02F 3/439 37/348 |
| 2009/0143896 A1* | 6/2009 | Janardhan | B25J 9/1638 700/213 |
| 2012/0158279 A1* | 6/2012 | Faivre | E02F 9/26 701/124 |
| 2013/0073151 A1 | 3/2013 | Wada et al. | |
| 2015/0006010 A1 | 1/2015 | Ito | |
| 2015/0354177 A1* | 12/2015 | Shatters | E02F 3/422 414/21 |
| 2015/0354178 A1* | 12/2015 | Jeong | E02F 9/267 340/438 |
| 2016/0060847 A1* | 3/2016 | Roach | G05B 15/02 701/50 |

FOREIGN PATENT DOCUMENTS

| | | |
|---|---|---|
| CN | 103603389 A | 2/2014 |
| EP | 0 129 422 A2 | 12/1984 |
| EP | 2 543 777 B1 | 1/2013 |
| EP | 2 815 943 A1 | 12/2014 |
| JP | 47-42765 A | 10/1972 |
| JP | 6-12546 A | 1/1994 |
| JP | 6-280467 A | 10/1994 |
| JP | 2005-30111 A | 2/2005 |
| JP | 2009-236752 A | 10/2009 |

OTHER PUBLICATIONS

The Office Action for the corresponding Chinese application No. 201680009666.0, dated Apr. 11, 2019.

The extended European search report for the corresponding European application No. 16814046.5, dated Oct. 12, 2018.

* cited by examiner

WHEEL LOADER AND METHOD FOR AUTOMICALLY ACCUMULATING TRANSPORT OPERATION INFORMATION OF WHEEL LOADER

CROSS-REFERENCE TO RELATED APPLICATIONS

This application is a U.S. National stage application of International Application No. PCT/JP2016/063439, filed on Apr. 28, 2016. This U.S. National stage application claims priority under 35 U.S.C. § 119(a) to Japanese Patent Application No. 2015-126610, filed in Japan on Jun. 24, 2015, the entire contents of which are hereby incorporated herein by reference.

BACKGROUND

Field of the Invention

The present invention discloses a wheel loader and a method for automatically accumulating transport operation information of the wheel loader.

A manual counter device is known that tallies loading operations of a bucket on a wheel loader and unloading operations onto a truck in order to manage the amount of work for an operator on board the wheel loader (see U.S. Pat. No. 7,633,021).

SUMMARY

The counter device as in U.S. Pat. No. 7,633,021 requires the operator to press a button corresponding to a loading operation of the bucket or an unloading operation onto the truck each time an operation is carried out. As a result, there is a problem that the operator operations are complicated.

The present description discloses a wheel loader that automatically detects a transport operation for transporting a load on a bucket including a loading operation of the bucket and an unloading operation onto a truck or hopper, and eases the work load of the operator.

A wheel loader according to a first aspect includes a boom, a bucket, a travel device, a travel distance measuring unit, a state determining unit, and an accumulating unit. The bucket is attached to the tip end of the boom. The travel distance measuring unit measures the travel distance. The state determining unit determines the loaded state of the bucket. The accumulating unit automatically accumulates transport operation information about the load on the bucket when a predetermined distance or more is traveled under the loaded state.
The transport operation information may be at least one of a transport operation frequency, a total transport weight, a total transport distance, and a total work amount.

The wheel loader may further include a forward/reverse travel switching device that issues an instruction for switching between forward travel and reverse travel of the travel device. The accumulating unit may accumulate the transport operation information when at least a predetermined distance has been traveled after switching to the reverse travel under the loaded state.

The state determining unit may further determine an unloaded state. The accumulating unit may not further accumulate the transport operation information until the unloaded state has been determined after the transport operation information has been accumulated.

The wheel loader may further include a hydraulic cylinder for driving the boom or the bucket. The state determining unit may include an oil pressure detector for detecting the oil pressure inside an oil chamber of the hydraulic cylinder. The state determining unit may determine that the loaded state has been entered when the oil pressure is equal to or greater than a first threshold.

The state determining unit may determine that the unloaded state has been entered when the oil pressure is equal to or less than a second threshold which is smaller than the first threshold.

The hydraulic cylinder may be a boom cylinder that raises and lowers the boom. The oil pressure detector may detect the oil pressure inside the oil chamber of the boom cylinder on the side where the pressure oil flows in when raising the boom.

The state determining unit may include an angle detector for detecting a boom angle which is a tilt angle of the boom. The first threshold may be defined in accordance with the boom angle. The second threshold may be defined in accordance with the boom angle.

The hydraulic cylinder may be a bucket cylinder that drives the bucket. The oil pressure detector may detect the oil pressure inside the oil chamber of the bucket cylinder on the side where the pressure oil flows in when tilting the bucket in the upward direction.

The state determining unit may include an angle detector for detecting a bucket angle which is the tilt angle of the bucket. The first threshold may be defined in accordance with the bucket angle. The second threshold may be defined in accordance with the bucket angle.

The state determining unit may determine that the loaded state has been entered when the bucket angle is equal to or greater than a predetermined threshold.

The state determining unit may include a position detector for detecting a tilt state of the bucket. The state determining unit determines that the loaded state has been entered when the tilt state of the bucket is detected.

The travel distance measuring unit may include a vehicle speed detector for detecting the vehicle speed. The travel distance measuring unit may calculate the travel distance on the basis of the vehicle speed.

The wheel loader may further include a display unit for displaying the transport operation information.

The wheel loader may further include an output unit for outputting the transport operation information.

A method for automatically accumulating transport operation information of a wheel loader according to a second aspect with a processing device and the wheel loader which includes a bucket, a travel device, a movement detector for detecting movement by the travel device, and a bucket state detector for detecting a state of the bucket. The method includes the following first to third steps. In the first step, first information is obtained for determining a loaded state of the bucket based on an output of the bucket state detector. In the second step, second information is obtained for deriving a travel distance of the wheel loader based on an output of the movement detector. In the third step, the processing device accumulates transport operation information when the wheel loader travels predetermined distance or greater under the loaded state on the basis of the first information and the second information.

Effects of Invention

The wheel loader according to the first aspect and the method for automatically accumulating the transport operation information of the wheel loader according to the second aspect determine the loaded state of the bucket and accumulate the transport operation information as the fact that a load has been transported when travel over a predetermined distance or greater has occurred under the loaded state. Therefore, the operator is not required to carry out a special operation for accumulating the transport operation information during the transport operation. Consequently, the work load of the operator is reduced.

DETAILED DESCRIPTION OF EMBODIMENT(S)

Figure 1:
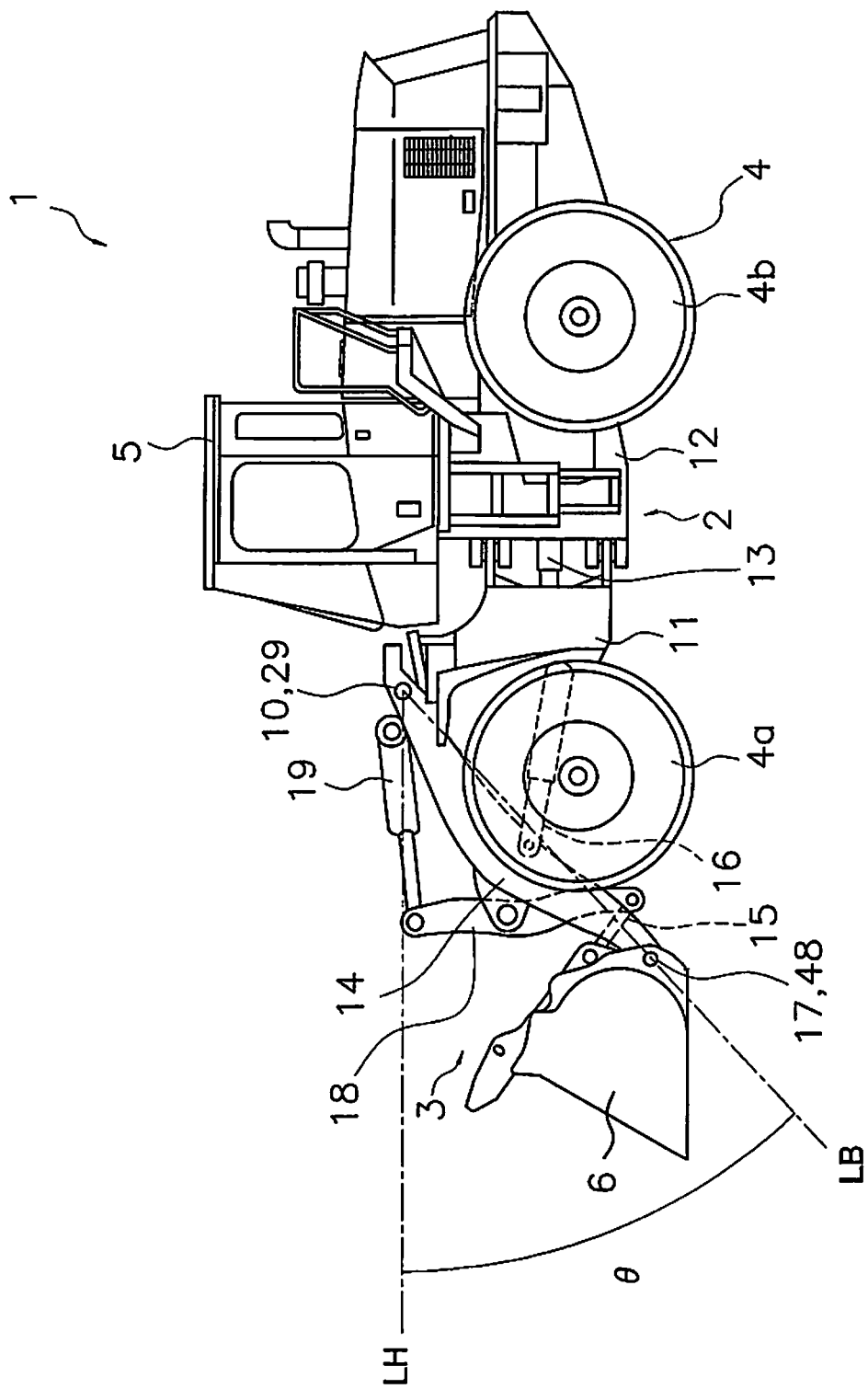
FIG. 1 is a side view of a wheel loader according to an embodiment.

Embodiments of the present invention will be explained in detail with reference to the figures. FIG. 1 is a side view of a wheel loader 1 according to an embodiment of the present invention. The wheel loader 1 includes a vehicle body frame 2, a work implement 3, a travel device 4, and a cab 5 as illustrated in FIG. 1. The travel device 4 includes traveling wheels 4a and 4b. The wheel loader 1 is capable of traveling due to the rotation of the traveling wheels 4a and 4b, and desired work can be conducted using the work implement 3.

The vehicle body frame 2 includes a front frame 11 and a rear frame 12. The front frame 11 and the rear frame 12 are attached to each other in a manner that allows swinging in the left-right direction. A steering cylinder 13 is attached to the front frame 11 and the rear frame 12. The steering cylinder 13 is a hydraulic cylinder. The wheel loader 1 is able to change the traveling direction to the right and left with the extension and contraction of the steering cylinder 13 due to hydraulic fluid from a steering pump (not illustrated).

The work implement 3 and the traveling wheels 4a are attached to the front frame 11. The work implement 3 includes a boom 14 and a bucket 6. The base end part of the boom 14 is rotatably attached to the front frame 11 with a boom pin 10. The bucket 6 is rotatably attached to the boom 14 with a bucket pin 17 located at the tip end of the boom 14. The front frame 11 and the boom 14 are coupled by a boom cylinder 16. The boom cylinder 16 is a hydraulic cylinder. The boom 14 is raised and lowered with the extension and contraction of the boom cylinder 16 due to hydraulic fluid from a work implement pump 25 (see FIG. 2). That is, the boom cylinder 16 drives the boom 14.

Moreover, the work implement 3 further includes a tilt arm 18, a bucket cylinder 19, and a tilt rod 15. The tilt arm 18 is rotatably supported on the boom 14 in the approximate center of the boom 14. The bucket cylinder 19 couples the base end part of the tilt arm 18 and the front frame 11. The tilt rod 15 couples the tip end part of the tilt arm 18 and the bucket 6. The boom cylinder 19 is a hydraulic cylinder. The bucket 6 rotates up and down due to the extension and contraction of the bucket cylinder 19 with hydraulic fluid from the work implement pump 25 (see FIG. 2). That is, the bucket cylinder 19 drives the bucket 6.

The cab 5 and the traveling wheels 4b are attached to the rear frame 12. That is, the cab 5 is disposed rearward of the boom 14. The cab 5 is disposed on the vehicle body frame 2. A seat for the operator to sit on and a belowmentioned operating device are disposed in the cab 5.

Figure 2:
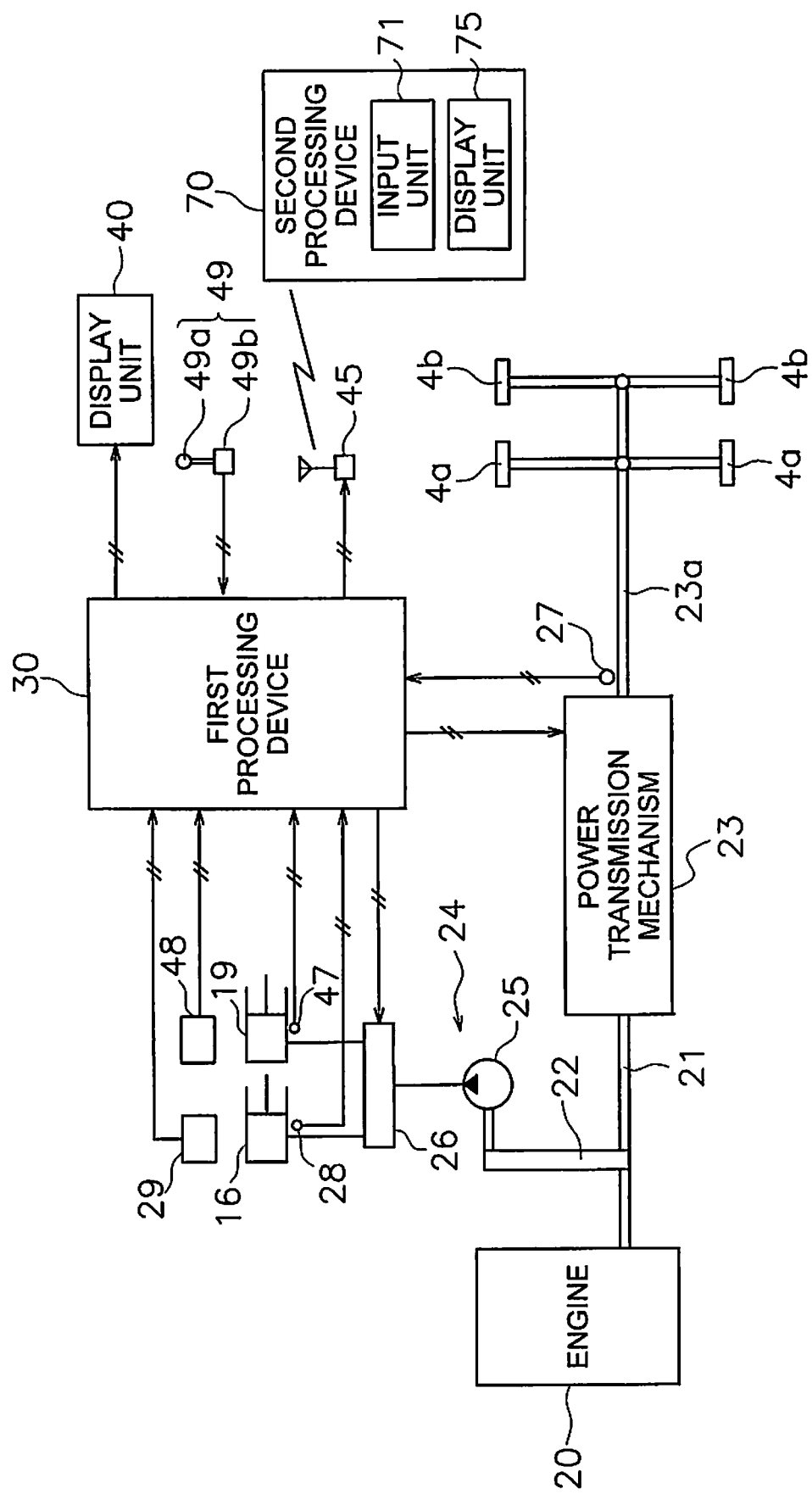
FIG. 2 is a schematic view of a configuration of the wheel loader.

FIG. 2 is a schematic view of a configuration of the wheel loader 1. The wheel loader 1 includes an engine 20, a power take-off unit (PTO) 22, a power transmission mechanism 23, a cylinder drive unit 24, a first angle detector 29, a first processing device 30, a forward/reverse travel switching device 49, a display unit 40, and an output unit 45.

The engine 20 is, for example, a diesel engine. The output of the engine 20 is controlled by adjusting the amount of fuel injected into the cylinders of the engine 20.

The power take-off unit 22 divides the output of the engine 20 to the power transmission mechanism 23 and the cylinder drive unit 24.

The power transmission mechanism 23 transmits the driving power from the engine 20 to the front wheels 4a and the rear wheels 4b. The power transmission mechanism 23 changes the speed and outputs the rotation of an input shaft 21.

A rotation sensor 27 for detecting the rotation speed of an output shaft 23a is attached to the output shaft 23a of the power transmission mechanism 23. The wheel loader 1 includes the rotation sensor 27. The rotation sensor 27 functions as a movement detector for detecting movement by the travel device 4. In other words, the rotation sensor 27 functions as a vehicle speed detector for detecting the vehicle speed.

The cylinder drive unit 24 includes the work implement pump 25 and a control valve 26. The output of the engine 20 is transmitted to the work implement pump 25 through the power take-off unit 22. Moreover, the hydraulic fluid discharged from the work implement pump 25 is supplied to the boom cylinder 16 and the bucket cylinder 19 through the control valve 26.

A first oil pressure detector 28 for detecting the oil pressure inside an oil chamber of the boom cylinder 16 is attached to the boom cylinder 16. The wheel loader includes the first oil pressure detector 28. The first oil pressure detector 28 detects the oil pressure (bottom pressure) inside the oil chamber on the bottom side where the pressure oil flows in when the boom 14 is raised. The first oil pressure detector 28 functions as a bucket state detector for detecting the state of the bucket 6.

The first angle detector 29 is a potentiometer, for example, attached to the boom pin 10. The first angle detector 29 detects a boom angle which indicates the hoisting angle (tilt angle) of the boom 14. Specifically, a boom angle θ is the angle of a straight line LB that extends from the center of the boom pin 10 in the direction toward the center of the bucket pin 17, with respect to a horizontal line LH that extends forward from the center of the boom pin 10 as depicted in FIG. 1. The boom angle θ is defined as being equal to zero degrees when the straight line LB is horizontal. The boom angle θ is considered positive when the straight line LB is higher than the horizontal line LH. The boom angle θ is considered negative when the straight line LB is lower than the horizontal line LH.

The forward/reverse travel switching device 49 is one of operating devices disposed in the cab 5. The forward/reverse travel switching device 49 includes an operating member 49a and a member position detection sensor 49b. The operating member 49a is operated by the operator for issuing an instruction to switch between the forward travel and reverse travel of the vehicle. The operating member 49a can be switched to the positions of forward travel, neutral, and reverse travel. The member position detection sensor 49b detects the position of the operating member 49a.

The first processing device 30 is configured by a microcomputer that includes a storage device such as a RAM or a ROM and the like, and a computation device such as a CPU and the like. The first processing device 30 may be realized as a portion of the functions of a controller which controls the operations of the engine 20, the work implement 3, and the power transmission mechanism 23 and the like. The first processing device 30 receives inputs of a signal of the output shaft rotation speed detected by the rotation sensor 27, a signal of the boom angle detected by the first angle detector 29, a signal of the bottom pressure of the boom cylinder 16 detected by the first oil pressure detector 28, and a signal of a forward/reverse travel command detected by the forward/reverse travel switching device 49. The first processing device 30 accumulates transport operation information of the load of the bucket 6 on the basis of the above input signals.

The transport operation information is, for example, a transport operation frequency, a total transport weight, a total transport distance, or a total work amount. The transport operation frequency indicates the number of times that a predetermined transport operation, such as a V-shape operation and the like, has been carried out from the start of the accumulation until the end thereof. The period from the start of the accumulation until the end thereof signifies a period in which the operator drives the wheel loader 1 within a predetermined time period such as, for example, one day. The period may be managed by being divided by each operator. The period may also be set manually by the operator. The total transport weight is the total weight of the loads transported by the bucket 6 from the start of the accumulation until the end thereof. The total transport distance is the total distance that the wheel loader 1 moves while carrying a load on the bucket 6 from the start of the accumulation until the end thereof. The total work amount is the product of the total transport weight and the total transport distance from the start of the accumulation until the end thereof.

The display unit 40 is disposed in the cab 5 and is a monitor that the operator views. The display unit 40 displays the transport operation information tallied by the first processing device 30. The output unit 45 outputs the transport operation information to a server (second processing device 70) disposed outside of the wheel loader 1. The output unit 45 may have a communication function such as, for example, wireless communication and may communicate with an input unit 71 of the second processing device 70. Alternatively, the output unit 45 may be an interface of a portable storage device (memory card and the like) that can be accessed, for example, by the input unit 71 of the second processing device 70. The second processing device 70 has a display unit 75 corresponding to a monitor function and is able to display the transport operation information output from the output unit 45.

(First Embodiment)

Figure 3:
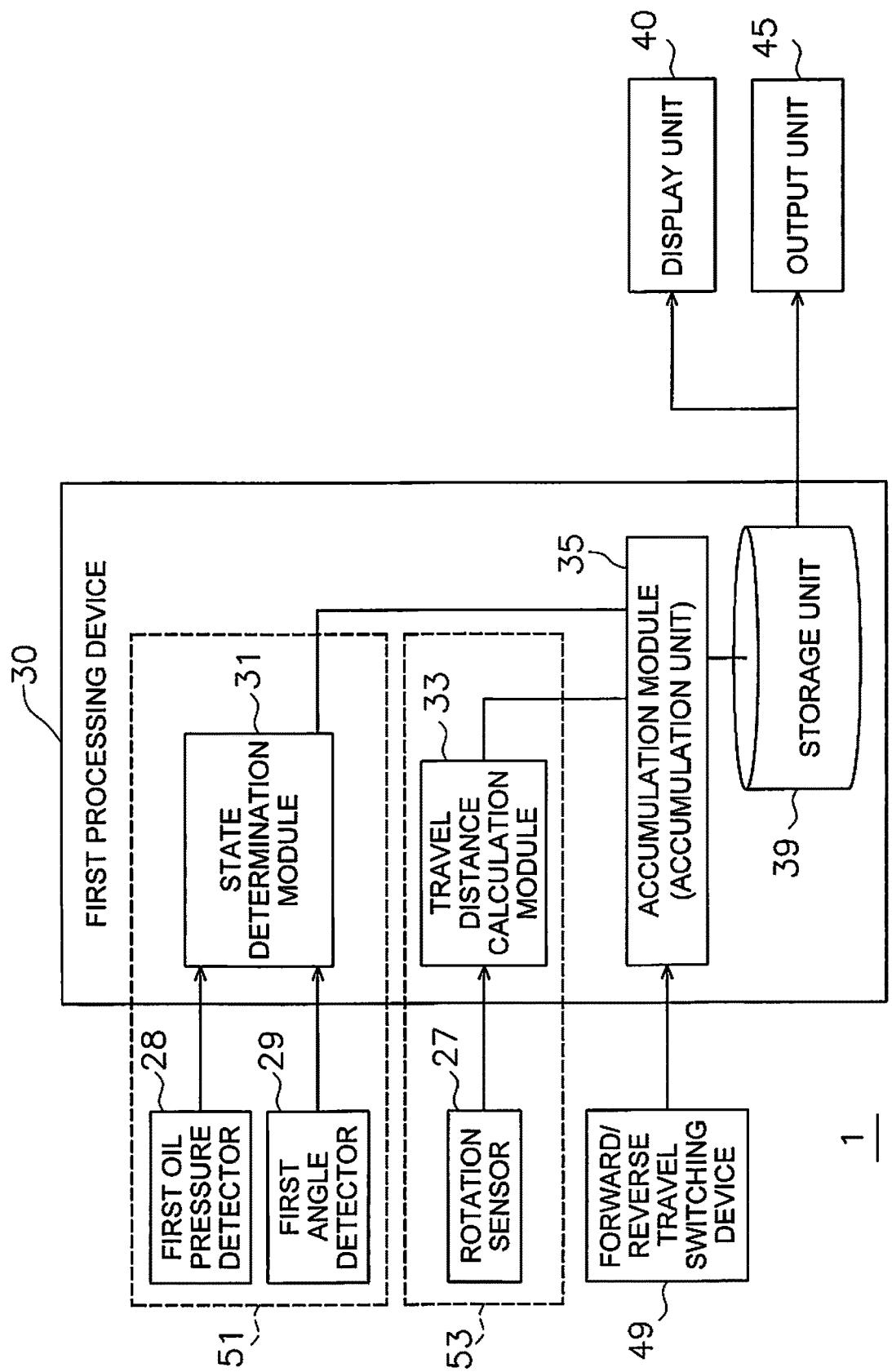
FIG. 3 is a block diagram of a first processing device according to a first embodiment.

FIG. 3 is a block diagram of a detailed configuration of a first processing device 30 according to a first embodiment.

The first processing device 30 includes a state determination module 31, a travel distance measurement module 33, and an accumulation module 35.

Typically, a program that executes each function of the state determination module 31, the travel distance measurement module 33, and the accumulation module 35 of the first processing device 30 is stored in a storage device of the first processing device 30. A computation device executes the program whereby the first processing device 30 executes the functions of the state determination module 31, the travel distance measurement module 33, and the accumulation module 35. The first processing device 30 may be realized by an integrated circuit.

A state determining unit 51 for detecting the loaded state of the bucket 6 is configured by the first oil pressure detector 28, the first angle detector 29, and the state determination module 31. The state determination module 31 determines the loaded state and the unloaded state of the bucket 6 based on the bottom pressure of the boom cylinder 16 detected by the first oil pressure detector 28, and the boom angle detected by the first angle detector 29. The loaded state signifies that a load is being carried by the bucket 6. The unloaded state signifies that no load is being carried by the bucket 6.

The state determination module 31 calculates a running average of the bottom pressure over a predetermined time interval and determines that the state is the loaded state when the running average of the bottom pressure is equal to or greater than a first threshold. The state determination module 31 determines that the state is the unloaded state when the running average of the bottom pressure is equal to or less than a second threshold that is less than the first threshold. The state determination module 31 determines that the state is the same as the previous state when the running average of the bottom pressure is less than the first threshold and greater than the second threshold. The first threshold and the second threshold are set in advance and are stored in the storage device of the first processing device 30 in a table format, for example. The first threshold and the second threshold are defined in accordance with the boom angle.

Figure 4:
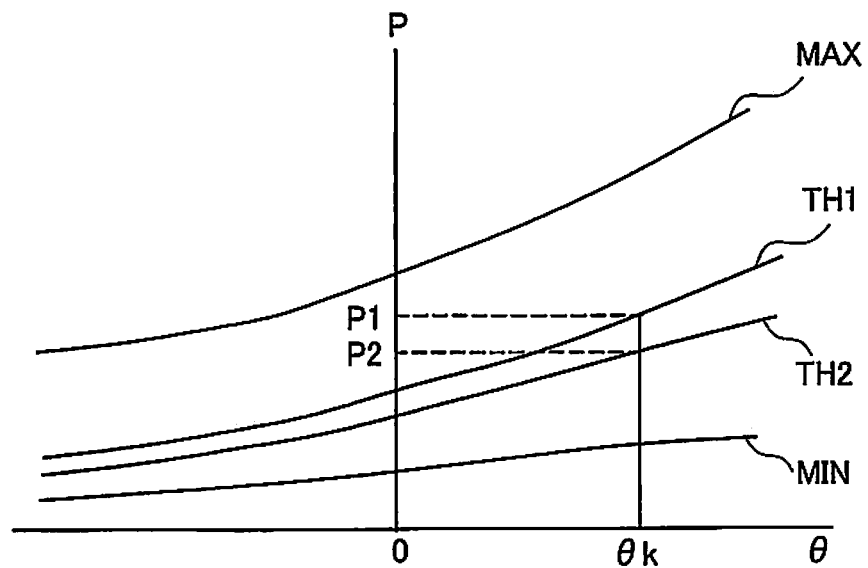
FIG. 4 is a graph depicting the relationship between a first threshold, a second threshold, and a boom angle.

FIG. 4 depicts an example of the relationship between the boom angle θ and the bottom pressure P for each loaded weight of the bucket 6. The MIN and MAX curves in FIG. 4 respectively indicate when the bucket 6 has reached an empty weight load and a rated weight load. The curves TH1 and TH2 respectively indicate the first threshold and the second threshold. The first threshold TH1 can be determined by previously measuring a bottom pressure P1 corresponding to each boom angle θk when, for example, a load of a first predetermined ratio of the rated weight is carried by the bucket 6. The second threshold TH1 can be determined by previously measuring a bottom pressure P2 corresponding to each boom angle θk when, for example, a load of a second predetermined ratio of the rated weight is carried by the bucket 6. Because the second predetermined ratio is less than the first predetermined ratio, the second threshold is less than the first threshold.

The first predetermined ratio is preferably set to a value of an extent in which the state is not falsely detected as a loaded state when carrying out grading work for leveling the ground by lowering the bucket 6 to the ground and traveling forward. The second predetermined ratio is preferably set to a value smaller by a predetermined value than the first predetermined ratio so that the state is not falsely detected as the unloaded state due to a variation in the oil pressure regardless of the loaded state of the wheel loader 1.

The state determining unit 51 (state determination module 31) may estimate the loaded weight of the bucket 6 when determining the loaded state. In this case, the state determination module 31 has a defined list of correspondence relations between, for example, the bottom pressure and the estimated load weight for each boom angle, and estimates the load weight of the bucket 6 from the running average of the bottom pressure.

The travel distance measuring unit 53 for measuring the travel distance is configured by the travel distance measurement module 33 and the rotation sensor 27. The travel distance measurement module 33 calculates the vehicle speed from the rotation speed of the output shaft 23a detected by the rotation sensor 27. The travel distance measuring unit 53 calculates the travel distance on the basis of the vehicle speed. For example, when a sampling interval of the rotation sensor 27 is T and an absolute value of the vehicle speed at each sampling time point is Vi, the travel distance measurement module 33 calculates the travel distance by accumulating the product of Vi and T.

The travel distance is calculated as a positive value regardless of the traveling direction of the wheel loader 1. Therefore, the sum of the travel distance moving during forward travel and the travel distance moving during reverse travel is calculated by the travel distance measurement module 33 even when carrying out a shuttle action such as when the wheel loader 1 switches between reverse travel to forward travel.

The travel distance measuring unit 53 (travel distance measurement module 33) may receive a determination result of the state determining unit 51 (state determination module 31) and measure the travel distance only according to the time point when the state is determined as the loaded state.

The accumulation module 35 configures the accumulating unit for automatically accumulating the transport operation information of the load of the bucket 6 when a predetermined distance or more is traveled during the loaded state. A forward/reverse travel command detected by the forward/reverse travel switching device 49 and the travel distance measured by the travel distance measurement module 33 are input to the accumulation module 35. A determination result of the state determination module 31 and the estimated load weight of the bucket 6 may further be input to the accumulation module 35.

The accumulation module 35 derives the travel distance while the loaded state continues after the travel direction has been switched to the reverse travel by the forward/reverse travel switching device 49. When the travel distance is equal to or greater than a predetermined distance, the accumulation module 35 accumulates the transport operation information.

When the transport operation information is the transport operation frequency, the accumulation module 35 increments the transport operation frequency one time. When the transport operation information is the total transport weight, the accumulation module 35 adds the estimated load weight of the bucket 6 input from the state determination module 31 to the total transport weight from the start of the accumulation. When the transport operation information is the total transport distance, the accumulation module 35 adds the movement distance of the wheel loader 1 until the time that the unloaded state is determined to the total transport distance from the start of the accumulation. When the transport operation information is the total work amount, the accumulation module 35 adds the product of the estimated load weight and the movement distance of the wheel loader 1 until the time that the unloaded state is determined to the total work amount from the start of the accumulation.

The predetermined distance for accumulating the transport operation information is referred to as a travel distance threshold. The travel distance threshold is set in advance on the basis of the characteristics of the assumed transport operation by the wheel loader 1 and is stored in the storage device of the first processing device 30. Details of a method for setting the travel distance threshold are explained below.

When the transport operation information is the transport operation frequency or the total transport weight, the accumulation module 35 does not further accumulate the transport operation information until the unloaded state is determined by the state determination module 31 after the transport operation information has been accumulated. Consequently, the transport operation frequency is not counted two or more times for each single operation of loading the load onto a dump truck 200. Moreover, the estimated load weight is not added two or more times for each single operation of loading the load onto a dump truck 200. The accumulation module 35 outputs the transport operation information of the load of the bucket 6 accumulated as described above, to the storage unit 39.

The storage unit 39 is configured as a portion of the storage device of the first processing device 30. The storage unit 39 stores the transport operation information of the load of the bucket 6 accumulated by the accumulation module 35. If the output unit 45 is an interface of a storage device (memory card and the like), the storage unit 39 may be a portable storage device. The display unit 40 reads and displays the transport operation information stored in the storage unit 39 and the like. The output unit 45 outputs the transport operation information stored in the storage unit 39 to the second processing device 70.

Figure 5:
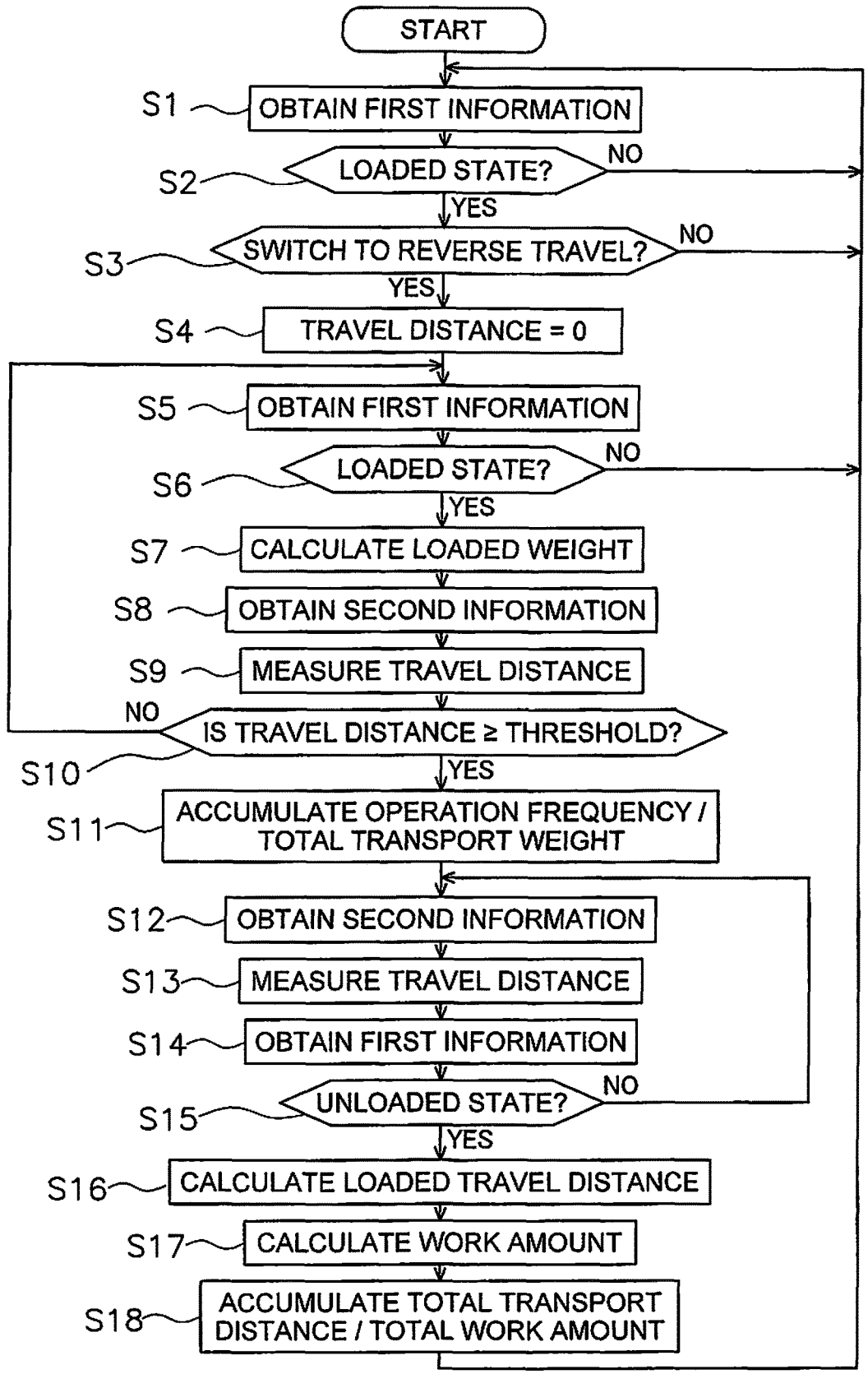
FIG. 5 is a flowchart illustrating a processing flow of the first processing device according to the first embodiment.

FIG. 5 is a flowchart illustrating a processing flow of the first processing device 30 according to the first embodiment. In this processing, the first processing device 30 (state determination module 31) firstly obtains first information D1 for determining the loaded state of the bucket 6 based on the output of the first oil pressure detector 28 (bucket state detector) (step S1). The first information D1 is, for example, a running average of the bottom pressure of the boom cylinder 16. The first processing device 30 (state determination module 31) then determines whether the state is the loaded state on the basis of the first information D1 (step S2). If the state is not determined as the loaded state (Step S2: No), the routine returns to step S1.

If the state is determined as the loaded state, the first processing device 30 waits until the travel direction is switched to the reverse travel (step S3: No; repeat S1 to S3). When the forward/reverse travel switching device 49 detects that the travel direction has switched to the reverse travel (step S3: Yes), the first processing device 30 (travel distance measuring unit 53) sets the travel distance of the wheel loader 1 to an initial value of zero (step S4).

Next, the first processing device 30 (state determination module 31) obtains the first information D1 (step S5). The first processing device 30 (state determination module 31) then determines whether the state is the loaded state on the basis of the first information D1 (step S6). The processing in steps S5 and S6 is the same as the processing in steps S1 and S2. If the state is not determined as the loaded state (Step S6: No), the routine returns to step S1.

If the state is determined as the loaded state (step S6: Yes), the first processing device 30 (state determination module 31) calculates the estimated load weight of the bucket 6 (step S7). Next, the first processing device 30 (travel distance measurement module 33) obtains second information D2 for deriving the travel distance of the wheel loader 1 based on the output of the rotation sensor 27 (movement detector) (step S8). The second information D2 is, for example, the rotation speed of the output shaft 23a calculated from the rotation sensor 27. The first processing device 30 (travel distance measurement module 33) then measures the travel distance under the loaded state (step S9). Specifically, at each sampling time point, the first processing device 30 (travel distance measurement module 33) calculates the vehicle speed Vi from the rotation speed of the output shaft 23a and adds the product of the vehicle speed Vi and the sampling interval T to the travel distance up to the current time point.

Next, the first processing device 30 (accumulating unit 35) determines whether the travel distance is equal to or greater than the travel distance threshold (step S10). If the travel distance is less than the travel distance threshold (step S10: No), the routine returns to step S5. If the travel distance is equal to or greater than the travel distance threshold (step S10: Yes), the first processing device 30 (accumulating unit 35) accumulates the transport operation frequency and the total transport weight (step S11). In this case, the first processing device 30 (accumulating unit 35) increments the transport operation frequency one time and adds the estimated load weight calculated in step S7 to the total transport weight from the start of the accumulation.

Thereafter, the first processing device 30 (travel distance measurement module 33) continuously obtains the second information D2 (step S12) and continuously measures the travel distance under the loaded state (step S13). The first processing device 30 (state determination module 31) obtains the first information D1 (step S14). The processing in steps S12, S13, and S14 is respectively the same as the steps S8, S9 and S1 (S5). The first processing device 30 (state determination module 31) then determines whether the state is the unloaded state on the basis of the first information D1 (step S15). If the state is not determined as the unloaded state (step S15: No), the processing from step S12 to step S15 is repeated.

If the state is determined as the unloaded state (step S15: Yes), the first processing device 30 (travel distance measurement module 33) calculates the loaded travel distance (step S16). The loaded travel distance is the total travel distance traveled by the wheel loader 1 from when the loaded travel distance was set to zero in step S4 until the unloaded state is detected in step S15. The first processing device 30 (accumulating unit 35) then calculates the work amount (step S17). The work amount is the product of the estimated load weight obtained in step S7 and the loaded travel distance obtained in step S16.

Finally, the first processing device 30 (accumulating unit 35) accumulates the total transport distance and the total work amount (step S18). In this case, the first processing device 30 (accumulating unit 35) may add the estimated load weight calculated in step S16 to the total transport distance from the start of the accumulation, and may add the work amount calculated in step S17 to the total work amount from the start of the accumulation. The routine returns to step S1 when step S18 is finished.

Figure 6:
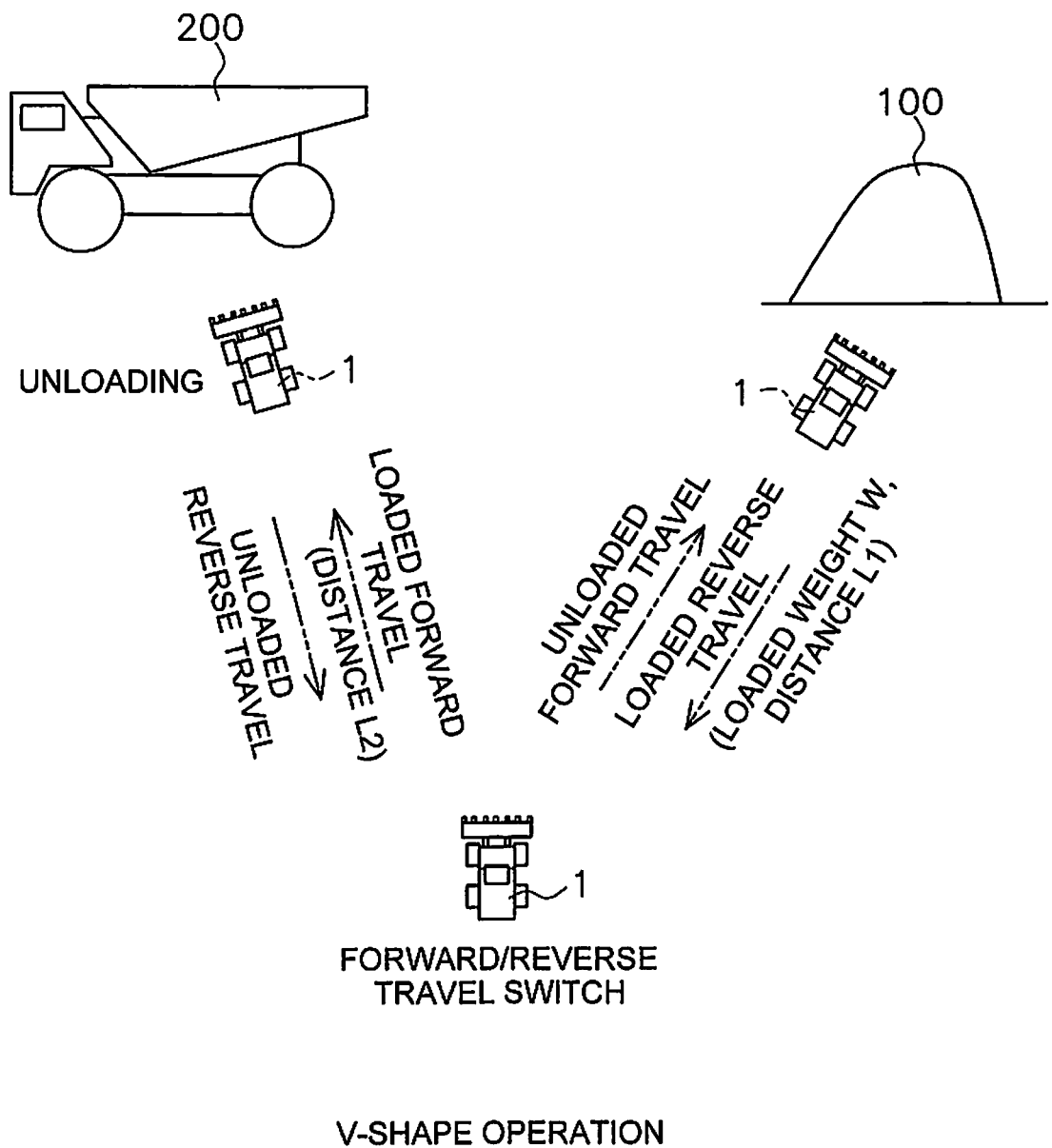
FIG. 6 is a schematic view of actions of the wheel loader when performing a V-shape operation.

Next, the flow of the processing by the first processing device 30 according to the first embodiment will be explained while being associated with the actions of the wheel loader 1 during a V-shape operation which is a typical operation of the wheel loader 1. As illustrated in FIG. 6, the V-shape operation is an operation for loading a load such as dirt and the like onto the dump truck 200 and the like. First, the wheel loader 1 plunges into a pile 100 of earth and the like, loads the load onto the bucket 6, and raises the bucket 6. At this time, the wheel loader 1 enters the loaded state (step S2: Yes).

Next, the travel direction is switched to the reverse travel with the forward/reverse travel switching device 49 of the wheel loader 1 (step S3: Yes), and the wheel loader 1 travels in reverse under the loaded state ("loaded reverse travel" in FIG. 6). Steps S4 to S6 are executed at this time, and because S6 is "Yes", steps S7 to S9 are executed. Therefore, a load weight W during the reverse travel is measured by the first processing device 30 (state determining unit 51). Similarly, a travel distance L1 during the reverse travel is measured by the first processing device 30 (travel distance measuring unit 53).

Next, the operator operates the forward/reverse travel switching device 49 and switches from the reverse travel to the forward travel. The wheel loader 1 then travels forward under the loaded state ("loaded forward travel" in FIG. 7). If the abovementioned travel distance L1 is less than the travel distance threshold, steps S5 to S9 are executed continuously. Because S6 is "Yes" at this time, the travel distance in the forward travel direction is also added to L1.

When the total travel distance in the forward travel direction is L2, the aforementioned travel distance threshold is set to a value less than the total travel distance (L1+L2) from when the travel direction was switched to the reverse travel. Specifically, the travel distance threshold is defined on the basis of the travel distance L under the loaded state when the wheel loader 1 is performing an I-shape operation in which the travel distance is less than the total travel distance (L1+L2).

Figure 7:
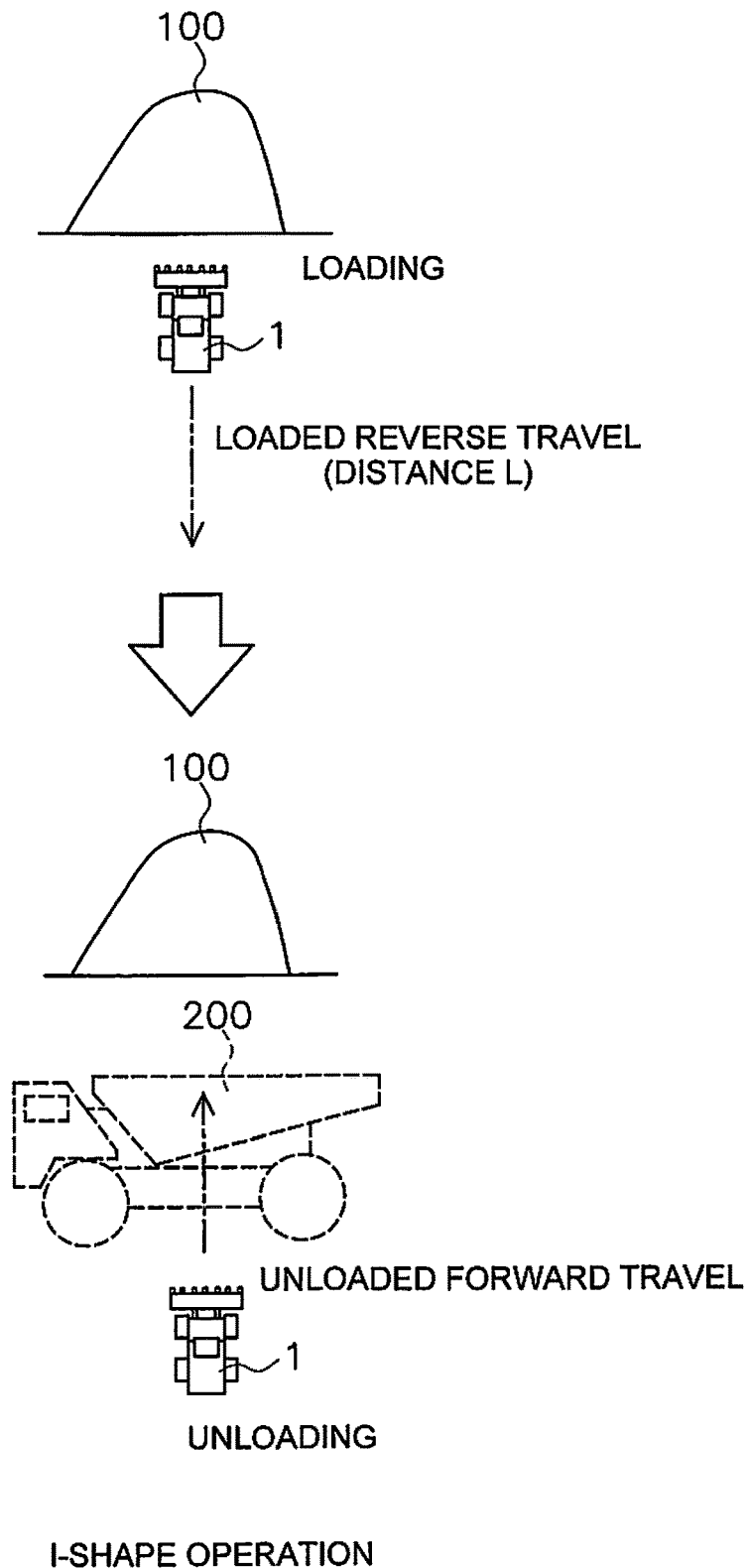
FIG. 7 is a schematic view of actions of the wheel loader when performing an I-shape operation.

The following explanation will focus on the difference between the I-shape operation and the V-shape operation. First as illustrated in FIG. 7, after the wheel loader 1 has traveled in reverse under the loaded state, the dump truck 200 intrudes between the pile 100 and the wheel loader 1 that has moved in reverse. The wheel loader 1 then loads the load of the bucket 6 onto the dump truck 200. Finally, the wheel loader 1 travels forward toward the pile 100 under the unloaded state. Therefore, the travel distance under the loaded state of the wheel loader 1 in the I-shape operation becomes the distance L in reverse travel under the loaded state.

Therefore, when assuming that the transport operation information can also be accumulated during the I-shape operation, the travel distance threshold may be set as a length equivalent to the vehicle width distance of the dump truck 200, for example.

In order to define the travel distance threshold as indicated above, the total travel distance from when the travel direction was switched to the reverse travel during either of the "loaded forward travel" or the "loaded reverse travel", becomes equal to or greater than the travel distance threshold, and at that stage, the transport operation frequency and the total transport weight are accumulated according to step S11.

After the total travel distance of the wheel loader 1 has become equal to or greater than the travel distance threshold, the travel distance is measured continuously (steps S12, S13), determinations are continuously made to determine whether the state has become the unloaded state (steps S14, S15), and the processing in steps S12 to S15 is repeated because the wheel loader 1 has entered the loaded state. Next, the operator operates the wheel loader 1 and unloads the load of the bucket 6 onto the dump truck 200 while the wheel loader 1 is positioned close to the dump truck 200. Therefore, the wheel loader 1 enters the unloaded state (step S15: Yes).

At this time, the loaded travel distance (L1+L2) is calculated in step S16 and the work amount (L1+L2)×W is calculated in step S17. Finally, the total transport distance and the total work amount are accumulated in step S18.

As described above, the first processing device 30 is able to properly count the transport operation frequency as the transport operation frequency of one V-shape operation. Moreover, the first processing device 30 is able to properly accumulate the total transport weight, the total transport distance, and the total work amount.

(Second embodiment)

The first processing device 30 built in the wheel loader 1 in the first embodiment executes all of the processing until the transport operation information is accumulated. However, a portion of the processing until the transport operation information is accumulated may be performed by a server (second processing device 70) disposed outside of the wheel loader 1. A first processing device and a second processing device that perform the processing in this way will be explained as a second embodiment. Matters in the second embodiment that duplicate the matters explained in the first embodiment will be omitted and only the contents that differ will be explained.

Figure 8:
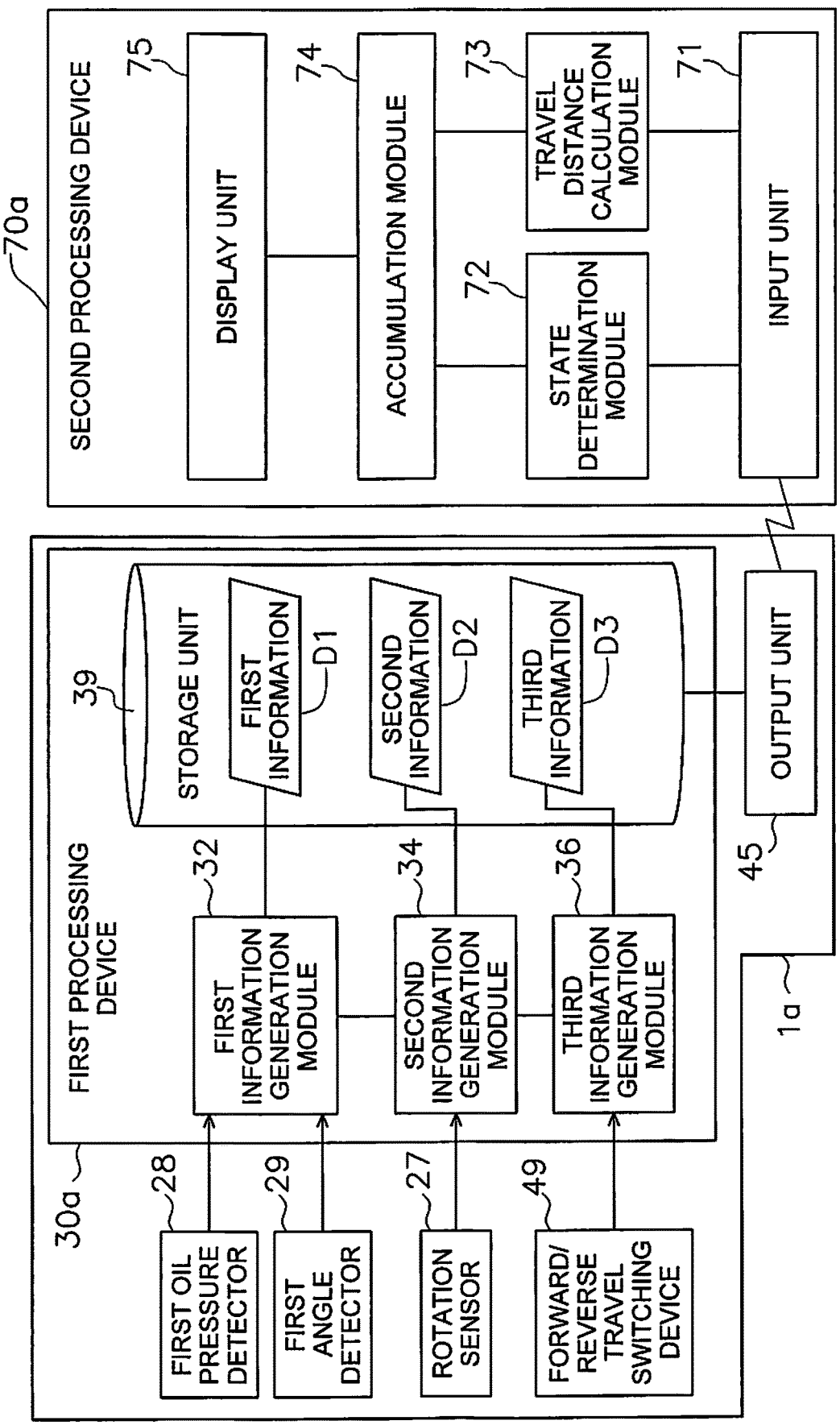
FIG. 8 is a block diagram of a first processing device and a second processing device according to a second embodiment.

In the second embodiment, reference numerals of the first processing device, the wheel loader, and the second processing device are respectively 30*a*, 1*a*, and 70*a*. FIG. 8 is a block diagram depicting a detailed configuration of the first processing device 30*a* and the second processing device 70*a* according to the second embodiment. Configurations other than the first processing device 30*a* in the wheel loader 1*a* are the same as those of the wheel loader 1 according to the first embodiment. The second processing device 70*a* is a server that receives data output by the first processing device 30*a* and accumulates the transport operation information.

The first processing device 30*a* includes a first information generation module 32, a second information generation module 34, a third information generation module 36, and a storage unit 39. The second processing device 70*a* includes at least an input unit 71, an accumulation module 74, and a display unit 75. The second processing device 70*a* may further include a state determination module 72 and a travel distance calculation module 73.

The functions that are the same as those of state determination module 31 in the first embodiment are realized by the first information generation module 32 and the state determination module 72. If the first information generation module 32 executes all of the functions of the state determination module 31, the state determination module 72 may be omitted. In this case, the first information generation module 32 outputs, for example, any of the following information as the first information D1 for determining the loaded state of the bucket 6 based on the outputs from the first oil pressure detector 28 (bucket state detector) and the first angle detector 29.

Determination results of "loaded state" and "unloaded state" at each sampling time point.

Starting and ending time points of "loaded state" and/or "unloaded state"

When the state determination module 72 executes a portion of the functions of the state determination module 31 in the first embodiment, the first information generation module 32 may output, for example, any of the following intermediate processing results as the first information D1 for determining the loaded state of the bucket 6 based on the outputs from the first oil pressure detector 28 (bucket state detector) and the first angle detector 29.

Bottom pressure and boom angle of the boom cylinder 16 at each sampling time point Running average of bottom pressure and boom angle of the boom cylinder 16 at each sampling time point Data indicating whether the running average of the bottom pressure of the boom cylinder 16 at each sampling time point is any of (1) equal to or greater than the first threshold, (2) less than the first threshold but greater than the second threshold, and (3) equal to or less than the second threshold The estimated load weight of the bucket 6 during one transport operation The functions that are the same as those of the travel distance measurement module 33 in the first embodiment are realized by the second information generation module 34 and the travel distance calculation module 73. If the second information generation module 34 executes all of the functions of the travel distance measurement module 33 of the first embodiment, the travel distance calculation module 73 may be omitted. In this case, the second information generation module 34 outputs the travel distance of the wheel loader 1*a* from the start time point until the end time point of the "loaded state" as the second information D2 for deriving the travel distance of the wheel loader 1*a* based on the output of the rotation sensor 27 (movement detector).

When the travel distance calculation module 73 executes a portion of the functions of the travel distance measurement module 33 of the first embodiment, the second information generation module 34 may output, for example, any of the following intermediate processing results as the second information D2 for deriving the travel distance of the wheel loader 1*a* based on the outputs from the rotation sensor 27 (movement detector).

Rotation speed of the output shaft 23*a* for each sampling time point

Vehicle speed for each sampling time point

Travel distance from one sampling time point to the subsequent sampling time point The functions that are the same as those of the accumulation module 35 in the first embodiment are realized by the third information generation module 36 and the accumulation module 74. The third information generation module 36 may output, for example, the following intermediate processing results as the third information D3 based on the forward/reverse travel commands detected by the forward/reverse travel switching device 49.

Status of any of "forward travel", "neutral" and "reverse travel" of the forward/reverse travel switching device 49 for each sampling time point Combination of the start time point and the end time point of the "reverse travel" status Time point when switched to "reverse travel" status The third information generation module 36 further may receive, from the second information generation module 34, information pertaining to the loaded travel distance of the wheel loader 1*a* from the start time point to the end time point of the "loaded state", and may output, for each period from switching to the reverse travel until the loaded state is completed, the collected information (this information is referred to below as completed preprocessing information) of the total movement distance during the above period as third information D3.

The storage unit 39 stores the first information D1, the second information D2, and the third information D3 output by the first to third information generation modules 32, 34, and 36. The storage unit 39 may not store the first information D1, the second information D2, and the third information D3 as different data and may, for example, store the first information D1, the second information D2, and the third information D3 as integrated data at each sampling time point. The storage unit 39 may not store unnecessary data in the accumulation of the transport operation information. For example, the storage unit 39 may not store the second information D2 at the time point of the "unloaded state".

The operations of the first processing device 30a and the second processing device 70a according to the second embodiment are essentially the same as the operations of the first embodiment depicted in FIG. 5 except for the operations specifically different from the first embodiment. The first information generation module 32 executes steps S1, S5 and S14, and the first information generation module 32 or the state determination module 72 executes steps S2, S7 and S15. The second information generation module 34 executes steps S8 and S12, and the second information generation module 34 or the travel distance calculation module 73 executes steps S9, S13 and S16. The third information generation module 36 or the accumulation module 74 executes step S3, and the accumulation module 74 executes steps S10, S11, S17 and S18.

According to the present embodiment, the second processing device 70a disposed outside of the wheel loader 1a is able to accumulate the transport operation information of the wheel loader 1a in the same way as in the first embodiment.

(Characteristics)
(1) The wheel loader 1 according to the first embodiment automatically determines the loaded state of the bucket 6 and accumulates the transport operation information as the fact that a load has been transported when the wheel loader 1 travels for a predetermined travel distance threshold or greater under the loaded state. The wheel loader 1a according to the second embodiment automatically extracts information (from the first information D1 to the third information D3) pertaining to the accumulation of the transport operation information from the operations of the wheel loader 1a following the normal operation instructions carried out by the operator, and outputs the information to the second processing device 70a. Therefore, the operator is not required to carry out a special operation for accumulating the transport operation information during the transport operation. Consequently, the work load of the operator is reduced.

Moreover, the transport operation information is not accumulated until the travel distance under the loaded state has reached or exceeded the travel distance threshold. Therefore, the operation for straightening (pushing upwards) the shape of the pile with the bucket 6 is prevented from being falsely detected as a transport operation.

(2) The wheel loader 1 (accumulating unit 35) according to the first embodiment and the second processing device 70a (accumulation module 74) according to the second embodiment accumulate the transport operation information when the wheel loader 1 or 1a travels a distance equal to or greater than the predetermined travel distance threshold after switching to the reverse travel under the loaded state. During the V-shape or I-shape operation assumed as the transport operation of the wheel loader 1 or 1a, the travel direction is necessarily switched to the reverse travel under the loaded state when transporting and, as a result, the detection accuracy of the transport operation is further improved.

(3) The wheel loader 1 (accumulating unit 35) according to the first embodiment and the second processing device 70a (accumulation module 74) according to the second embodiment do not further accumulate the transport operation information until when the state is determined as the unloaded state after the transport operation information pertaining to the transport operation frequency and the total transport weight has been accumulated. As a result, a single transport operation is prevented from being accumulated two or more times.

(4) The wheel loader 1 and 1a detect the bottom pressure of the boom cylinder 16 with the first oil pressure detector 28 and determine that the state is the loaded state when the bottom pressure is equal to or greater than the first threshold. As a result, there is no need to match the orientation of the bucket 6 to a specific orientation as indicated by a conventionally known bucket loading weight measurement method (see, for example, Japanese Laid-Open Patent Publication No. 2001-99701) when determining the loaded state of the bucket 6. As a result, the work load of the operator is further reduced.

Moreover, there is no need to install a special sensor for determining the loaded state in the wheel loader 1 or 1a. Therefore, the bucket state detector for detecting the state of the bucket 6 can be configured at a low cost.

(5) The unloaded state is determined when the bottom pressure becomes equal to or less than the second threshold which is lower than the first threshold. As a result, the false determination of the unloaded state due to a fluctuation in the oil pressure regardless of whether the state of the wheel loader 1 or 1a is the loaded state, can be prevented.

(6) The first threshold and the second threshold may be defined in accordance with the boom angle. The detection accuracy of the loaded state or the unloaded state is improved due to the first threshold and the second threshold being defined in this way because the bottom pressure changes in response to the boom angle even if the load applied to the bucket 6 is the same.

(Modified Examples)
The present invention is not limited to the above embodiment and various changes and modifications may be made without departing from the spirit of the invention.

While the "loaded state" and the "unloaded state" are determined on the basis of the bottom pressure of the boom cylinder 16 and the boom angle in the above embodiments, the "loaded state" and the "unloaded state" may also be determined on the basis of the bottom pressure of the bucket cylinder 19 and the tilt angle of the bucket 6.

In this case, the wheel loader 1 in FIG. 2 includes a second oil pressure detector 47 for detecting the oil pressure inside the oil chamber of the bucket cylinder 19, and a second angle detector 48 for detecting the tilt angle which indicates the angle of inclination upward of the bucket 6. The second oil pressure detector 47 detects the oil pressure (bottom pressure) inside the oil chamber on the bottom side where the pressure oil flows in when the bucket 6 is inclined upward. The second oil pressure detector 47 functions as a bucket state detector for detecting the state of the bucket 6. The second angle detector 48 is a potentiometer, for example, attached to the bucket pin 17.

Even if the "loaded state" and the "unloaded state" are determined by the second oil pressure detector 47 and the second angle detector 48, the first threshold and the second threshold of the bottom pressure of the bucket cylinder 19 may be previously defined in accordance with the tilt angle. Further, the "loaded state" and the "unloaded state" may be determined through the threshold processing described in the above embodiments. The same effect as the determination using the boom angle of the boom cylinder 16 is achieved with the above determination method.

A weight sensor of the bucket 6 may be mounted on the wheel loader 1 or 1a of the above embodiments, and the "loaded state" and the "unloaded state" may be determined with the weight sensor. The first information D1 may be generated from outputs from the weight sensor. In this case, the weight sensor functions as the bucket state detector for detecting the state of the bucket.

While the "loaded state" and the "unloaded state" are determined on the basis of the bottom pressure of the boom cylinder 16 and the boom angle in the above embodiments, the "loaded state" and the "unloaded state" may also be determined by detecting whether or not a tilted state is entered which indicates that the tilt angle of the bucket 6 is equal to or greater than a predetermined angle. In this case, the wheel loader 1 includes the aforementioned second angle detector 48. The second angle detector 48 is a potentiometer or a proximity switch, for example, attached to the bucket pin 17.

The rotation sensor 27 in the above embodiments may detect the rotation speed of the input shaft 21 of the power transmission mechanism 23 instead of the output shaft 23a of the power transmission mechanism 23. In this case, the vehicle speed may be calculated by further taking into consideration the speed reduction ratio of the power transmission mechanism 23. Moreover, the travel distance may be measured by a positioning sensor such as a GPS or a laser instead of the rotation sensor 27. The second information D2 may be generated from the outputs of the positioning sensor. In this case, the positioning sensor functions as a movement detector for detecting movement by the travel device 4.

While an example of accumulating the transport operation information of all of the transport operation frequency, the total transport weight, the total transport distance, and the total work amount has been described in the above embodiments, the transport operation information of a portion of the transport operation frequency, the total transport weight, the total transport distance, and the total work amount may be accumulated. In this case, the functions of the first processing device 30 and 30a and the second processing device 70a pertaining to the transport operation information that is not accumulated may be omitted. Moreover, the processing in FIG. 5 pertaining to the transport operation information that is not accumulated may be omitted.

The accumulation module 35 (accumulating unit) in the first embodiment may not receive a signal pertaining to the forward/reverse travel switch command from the forward/reverse travel switching device 49. Similarly, the third information generation module 36 in the first processing device 30a in the second embodiment may be omitted. At this time, the accumulation module 74 may accumulate the transport operation information without receiving the input of the third information D3. In the above case, step S3 in FIG. 5 may be omitted.

The third information generation module 36 in the second embodiment may not receive the signal pertaining to the forward/reverse travel switch command from the forward/reverse travel switching device 49, and may output the information for which the total movement distance is collected during each period from the transition to the loaded state until the loaded state is completed, as the third information D3 pertaining to the completed preprocessing information. The accumulation module 74 may accumulate the transport operation information on the basis of the completed preprocessing information.

The storage unit 39 and the output unit 45 in FIG. 3 may be omitted in the first embodiment. When the storage unit 39 is omitted, the accumulation module 35 may output the transport operation information directly to the display unit 40.

All of the processing depicted in FIG. 5 in the above embodiments may not be performed in real time, and the transport operation information may be accumulated by analyzing the first information D1, the second information D2, and the third information D3 recorded in a time sequence and carrying out batch processing.

INDUSTRIAL APPLICABILITY

A wheel loader can be provided that automatically accumulates transport operation information for managing the work amount of an operator.

What is claimed is:
1. A wheel loader comprising:
a boom;
a bucket attached to a tip end of the boom;
a travel device;
a forward/reverse travel switching device configured to issue an instruction to switch the wheel loader between forward travel and reverse travel of the travel device; and
a controller configured to
determine a travel distance of the wheel loader,
determine whether the bucket is in a loaded state or an unloaded state, and
automatically accumulate transport operation information about a load on the bucket when the wheel loader is switched to the reverse travel under the loaded state and travels at least a predetermined distance under the loaded state after switching to the reverse travel,
the controller being further configured not to accumulate the transport operation information when the controller determines that the bucket entered the unloaded state before the wheel loader had traveled at least the predetermined distance after switching to the reverse travel under the loaded state.
2. The wheel loader according to claim 1, wherein the transport operation information is a transport operation frequency.
3. The wheel loader according to claim 1, wherein the transport operation information is a total transport weight.
4. The wheel loader according to claim 1, wherein the transport operation information is a total transport distance.
5. The wheel loader according to claim 1, wherein the transport operation information is a total work amount.
6. The wheel loader according to claim 2, wherein the controller does not further accumulate the transport operation information until the unloaded state is determined after the transport operation information is accumulated.
7. The wheel loader according to claim 1, further comprising:
a hydraulic cylinder arranged to drive the boom or the bucket,
the controller being arranged to receive a signal from an oil pressure detector that detects an oil pressure inside an oil chamber of the hydraulic cylinder, and the controller being configured to determine the loaded state when the oil pressure is equal to or greater than a first threshold.

8. The wheel loader according to claim 7, wherein the controller is configured to determine the unloaded state when the oil pressure is equal to or less than a second threshold which is smaller than the first threshold.

9. The wheel loader according to claim 8, wherein the hydraulic cylinder is a boom cylinder used to raise and lower the boom, and
the oil pressure detector detects the oil pressure inside the oil chamber of the boom cylinder on a side where the pressure oil flows in when raising the boom.

10. The wheel loader according to claim 9, wherein the controller is arranged to receive a signal from an angle detector that detects a boom angle that is a tilt angle of the boom, and
the first threshold is defined in accordance with the boom angle.

11. The wheel loader according to claim 10, wherein the second threshold is defined in accordance with the boom angle.

12. The wheel loader according to claim 8, wherein the hydraulic cylinder is a bucket cylinder that drives the bucket, and
the oil pressure detector detects the oil pressure inside the oil chamber of the bucket cylinder on a side where the pressure oil flows in when tilting the bucket in an upward direction.

13. The wheel loader according to claim 12, wherein the controller is arranged to receive a signal from an angle detector that detects a bucket angle that is a tilt angle of the bucket, and
the first threshold is defined in accordance with the bucket angle.

14. The wheel loader according to claim 13, wherein the second threshold is defined in accordance with the bucket angle.

15. The wheel loader according to claim 1, wherein the controller is arranged to receive a signal from an angle detector that detects a bucket angle that is a tilt angle of the bucket, and
the controller determines the loaded state when the bucket angle is equal to or greater than a predetermined threshold.

16. The wheel loader according to claim 1, wherein the controller is arranged to receive a signal from a position detector that detects a tilt state of the bucket, and
the controller determines the loaded state when the tilt state of the bucket is detected.

17. The wheel loader according to claim 1, wherein the controller is arranged to receive a signal from a vehicle speed detector that detects a vehicle speed of the wheel loader, and
the controller calculates the travel distance based on the vehicle speed.

18. The wheel loader according to claim 1, further comprising:
a display configured to display the transport operation information.

19. The wheel loader according to claim 1, wherein the controller is configured to output the transport operation information.

20. A method for automatically accumulating transport operation information for a wheel loader with a processing device, the wheel loader including a bucket, a travel device, a movement detector to detect movement by the travel device, and a bucket state detector to detect a state of the bucket, the method comprising:
obtaining first information in order to determine whether the bucket is in a loaded state or an unloaded state based on an output of the bucket state detector;
obtaining second information in order to derive a travel distance of the wheel loader based on an output of the movement detector;
obtaining third information in order to determine whether the wheel loader has been switched between forward travel and reverse travel of the travel device;
accumulating the transport operation information by the processing device when, based on the first information, the second information, and the third information, it is determined that the wheel loader has switched to the reverse travel under the loaded state and traveled a predetermined distance or greater under the loaded state after switching to the reverse travel; and
not accumulating the transport operation information when it is determined that the bucket entered the unloaded state before the wheel loader had traveled at least the predetermined distance after switching to the reverse travel under the loaded state.

* * * * *